United States Patent Office 3,234,091
Patented Feb. 8, 1966

3,234,091
SHAPED MEDICAMENTS AND PROCESS FOR THEIR MANUFACTURE
Emil Lang, Riehen, and Peter Speiser, Forch, Zurich, Switzerland, assignors to Ciba Corporation, New York, N.Y., a corporation of Delaware
No Drawing. Filed Jan. 28, 1963, Ser. No. 254,463
Claims priority, application Switzerland, July 8, 1955, 21,899/55
6 Claims. (Cl. 167—64)

This is a continuation-in-part of our co-pending application Serial No. 595,826 filed July 5, 1956 (now abandoned).

This invention relates to suppositories for rectal and vaginal application, such as medicaments in small stick shapes and round products for vaginal application or oval products especially for rectal application and also a process for their manufacture.

It is known that suppositories, for example, are prepared by casting or moulding, there being used as carrier for the medicament fats which melt at body temperature, such as cocoa butter, hydrogenated fats and synthetic fat bases or hydrogels which are soluble in the rectal secretion, such as nutural and synthetic mucilages, gelatine, polyethylene oxides and so on or also emulsions containing substances of both types.

All these base types exhibit certain disadvantages which very considerably limit their application.

Suppositories containing fats are especially sensitive to heat, i.e. on storage they are liable to the danger of becoming rancid and on account of their low melting point they cannot be used, for example, in tropical regions; in certain cases they exhibit in addition a very poor capacity for absorption by the body. Disadvantages of suppositories having a water-soluble base include primarily the limited stability and also the loss of water on storage. Moreover such bases have exhibited irritation effects or insufficient absorption by the body of the medicament incorporated therein. The above-mentioned emulsions as a rule suffer from the disadvantages of both types of substance contained therein.

In order to avoid these disadvantages attempts have already been made in certain cases to use other bases. However, it has often been found that the new substances used exhibit certain other disadvantages, as for example irritation of the intestine. Furthermore, it has hitherto not been possible to produce suppositories containing crystalline, relatively low melting active substances and giving satisfactory results on therapeutic application. Such active materials become in part melted and dissolved in the process of manufacture of the suppositories and then crystalise on cooling and on storage develop coarse crystals or even lumps, so that on account of their small effective surface they are only absorbed very slowly or not at all by the intestine.

According to the present invention suppositories for rectal and/or vaginal application which do not exhibit the specified disadvantages are obtained by drying under vacuum a mixture, such as a solution or suspension or (a) a solid lyophile non-toxic carrier substance or substances which do not irritate the organs or tissues, (b) the desired solid therapeutically active component and (c) an aqueous diluent in the frozen and shaped state suitable for rectal or vaginal application, which diluent contains said solid ingredients in such a proportion that the product has the stability required for a suppository, preferably in a proportion of at least about 6 percent by weight, preferably in a proportion of about 10 to 60 or in the first place 15 to 50 percent by weight, said suppository retaining substantially the form of the frozen state.

As solid lyophile nontoxic carrier substance there is used one which is completely wettable in rectal or vaginal secretion and forms therein, within a short time and advantageously without swelling, a solution or suspension, primarily a high molecular substance which is sol- or gel-forming in water. Such carrier comprises for example, gelatine, natural or synthetic mucilages, polyethylene oxides and derivatives thereof, high or low molecular carbohydrates and derivatives thereof, such as starch dextrin, glucose, lactose, saccharose, water-soluble silicic acid and derivatives thereof and water-soluble derivatives such as silicic acid, sodium disilicate or aluminum hydroxide of aluminum oxide and mixtures thereof.

The solubility properties of these substances can be adapted to the required absorption conditions by suitable selection of the filling and/or auxiliary substances. According to the desired effect the preparation may contain one or more active constituents. As solvent or suspending agent there is used, above all, water.

Under the process of the invention, the solution of suspension of the lyophile carrier substance, the active substance and any filling or other auxiliary substance, such as a wetting or preserving agent is poured into a mould, for example, a suppository, stick, almond or sphere-shaped mould and cooled to such a temperature that the solution becomes solid, then with or without first removing the mould, the frozen and shaped preparation is so far dried in vacuo, especially in a high vacuum, at a temperature below the freezing point of the solution, that at least the moulded product retains its shape at ordinary temperature and then, if desired, heated to a higher temperature and any solvent or suspending agent still present removed.

There are obtained in this manner shaped medicament carriers in which the constituents are dispersed in the same manner as in a solution or suspension, that is to say, in such special concentration or dispersion as corresponds to the concentration or dispersion of the substance mentioned in solution or emulsion. In other words, the active substance is distributed within an extremely fine structure which guarantees favourable wetting by the rectal or vaginal secretion and excellent absorption.

The resistance to heat of the resulting medicament carriers is considerably improved, for example compared with suppositories as hitherto manufactured, so that they can also be used under tropical conditions. Practically no ageing effects are observed, on which account good storage capacity and stability are guaranteed.

A further advantage of the process and product of the present invention is that low melting point crystalline active ingredients can be included in a very finely divided form which is therefore more easily absorbed by the body, in medicament carriers for rectal and vaginal application. As already mentioned above this has not been possible in the case of suppositories of current manufacture.

The following examples illustrate the invention:

*Example 1*

44 grams of gelatine are dissolved by swelling in 1800 grams of distilled water. The solution is treated with 198 grams of polyethylene oxide of molecular weight 6000 and 66 grams of colloidal silicic acid. To this solution are added 10 grams of phenylcyclohexyloxyacetic acid-diethylamino ethyl ester brommethylate and solution effected at about 25° C. without heating. The whole is then made up with water to a total of 2200 grams and the homogeneous solution is filled into moulds each of 2.2 grams capacity at 25° C. The moulds are then cooled to −20° C. and after 40 minutes the solid frozen suppository mass is taken out of the mould and freeze-dried in a precooled freeze-drying apparatus under a high vacuum of $10^{-2}$ to $10^{-3}$ mm. of mercury at an initial temperature of —20° C. which is slowly raised. The completely dried moulded products are removed from the apparatus after a drying time of about 20 hours at a final temperature of 35° C. so that each suppository contains:

| | Mg. |
|---|---|
| Phenylcyclohexyloxyacetic acid-diethylaminoethyl ester brommethylate | 10 |
| Polyethylene oxide 6000 | 198 |
| Gelatine | 44 |
| Colloidal silicic acid | 66 |
| Total | 318 |

Example 2

20 grams of gelatine are dissolved by swelling in 1000 grams of water.

1000 grams of α-phenyl-α-ethyl glutaric acid imide are ground with
11 grams of polyoxyethylene sorbitan monostearate and the gelatine-water solution in small portions to a homogeneous suspension. Finally
55 grams of polyethylene oxide 6000 are dissolved in the suspension and the whole made up with distilled water to a total of 2200 grams. The homogeneous suspension is filled into pre-cooled moulds for suppositories, frozen to —20° C. and further working up carried out as described in Example 1, so that after the freeze-drying each suppository has the following composition:

| | Mg. |
|---|---|
| α-Phenyl-α-ethyl glutaric acid imide | 1000 |
| Polyethylene oxide 6000 | 55 |
| Gelatine | 20 |
| Polyoxyethylene sorbitan monostearate | 11 |
| Total | 1086 |

Example 3

28 grams of gelatine are dissolved by swelling in 1200 grams of water.

150 grams of 5-chloro-7-iodo-8-hydroxypinoline and
350 grams of the condensation product of 2-sulfanilamido-thiazole and formaldehyde are worked up with a portion of the gelatine solution to a homogeneous suspension.

Thereupon the residue of the gelatine solution, 100 grams of lactose,
12 grams of polyoxyethylene sorbitan monolaurate and
60 grams of polyethylene oxide (mol. wt. 20,000) are added.

Then the whole is made up with water to 2000 grams. The homogeneous mixture is poured at about 30° C. into egg-shaped mouldings intended for the production of products for vaginal application, whereupon freezing is immediately carried out at —20° C. The frozen egg-shaped masses are taken out of the moulds and the freeze-drying operation carried out as described in Example 1. Each individual egg-shaped medicament produced has the following composition:

| | Mg. |
|---|---|
| 5-chloro-7-iodo-8-hydroxyquinoline | 150 |
| Condensation product from 2-sulfanilamido thiazole and formaldehyde | 350 |
| Lactose | 100 |
| Gelatine | 28 |
| Polyoxyethylene sorbitan monolaurate | 12 |
| Polyethylene oxide 20,000 | 60 |
| Total | 700 |

Example 4

100 grams of glucose,
100 grams of lactose,
20 grams of boric acid, and
5 grams of β-phenylethyl-dimethyl-dodecyl ammonium bromide are dissolved in
925 grams of distilled water. In this solution,
500 grams of a condensation product from 2-sulfanilamido-thiazole and formaldehyde, and
250 grams of 5-chloro-7-iodo-8-hydroxyquinoline are suspended and homogenized. At room temperature, the homogeneous mixture is filled into pre-cooled moulds for vaginal inserts and immediately frozen at —25° C. While still in the mould, the frozen ovule mass is subjected to freeze drying in a manner analogous to that described in Example 1. On removal of the mould, ovules of the following composition are obtained:

| | Mg. |
|---|---|
| Glucose | 100 |
| Lactose | 100 |
| Boric acid | 20 |
| β-Phenylethyl - dimethyl - dodecyl - ammonium bromide | 5 |
| Condensation product from 2-sulfanilamido-thiazol and formaldehyde | 500 |
| 5-chloro-7-iodo-8-hydroxyquinoline | 250 |
| Total | 975 |

Example 5

44 grams of gelatine are dissolved by swelling in 1700 grams of distilled water. The solution is mixed with 198 grams of polyethylene oxide, molecular weight 6000,
66 grams of colloidal silicic acid, and
110 grams of ethanol of 95 percent strength.

In this solution are dissolved at about 25° C. without heating 10 grams of phenylcyclohexylhydroxy-acetic acid-diethyl-aminoethylester brommethylate.

A total of 2200 grams is then made up with water and the homogeneous solution poured at room temperature into pre-cooled moulds of 2.2 grams capacity. The moulds are then cooled to —35° C. and after 40 minutes the frozen suppository mass is removed from the moulds and subjected to freeze-drying in a pre-cooled freeze drying apparatus under a pressure of $10^{-2}$ to $10^{-3}$ mm. pressure of mercury at an initial temperature of —20° C. which is then slowly raised. The completely dried moulded products are removed from the apparatus after a drying time of about 20 hours at a final temperature of 35° C. so that each suppository contains:

| | Mg. |
|---|---|
| Phenylcyclohexylhydroxy-acetic acid diethylaminoethyl ester-brommethylate | 10 |
| Polyethylene oxide 6000 | 198 |
| Gelatine | 44 |
| Colloidal silicic acid | 66 |
| Total | 318 |

We claim:
1. A suppository for rectal and vaginal application comprising an effective amount of a solid therapeutically active component therefor and about 8 percent to about 97 percent by weight of a solid lyophilic, non-toxic carrier comprising materials selected from the group consisting of gelatine, mucilage, polyethylene oxides, having an average molecular weight at least about 6000, starch, dextrin, glucose, lactose, saccharose, a higher aliphatic ester of polyoxyethylene sorbitan, sodium disilicate, silicic acid and water-soluble derivatives of aluminum oxide and aluminum hydroxide, said suppository having been obtained by drying under vacuum in the frozen and shaped state the mixture of the therapeutically active component, the solid lyophilic, non-toxic carrier and an aqueous diluent, which diluent contains said solid ingredients in a proportion of about 6 to about 60 percent by weight, said suppository retaining substantially the form of the frozen state.

2. A suppository as set forth in claim 1, wherein the carrier comprises a polyethylene oxide having an average molecular weight at least about 6000.

3. A suppository as set forth in claim 1 wherein the carrier comprises gelatine.

4. A suppository as set forth in claim 1, wherein the carrier comprises a mixture of glucose and gelatine.

5. A suppository as set forth in claim 1, wherein the carrier contains colloidal silicic acid.

6. A suppository as set forth in claim 1, wherein the diluent contains said solid ingredients in a proportion of about 15 to 50 percent by weight.

References Cited by the Examiner

UNITED STATES PATENTS

| | | | |
|---|---|---|---|
| 2,166,074 | 7/1939 | Reichel | 34—5 X |
| 2,191,139 | 2/1940 | Bibbins | 167—64 |
| 2,465,357 | 3/1949 | Correll | 167—64 X |
| 2,558,395 | 6/1951 | Studer | 167—63 |
| 2,726,982 | 12/1955 | Ochs et al. | 167—58 |

OTHER REFERENCES

Caspari, Treatise on Pharmacy, 8th ed., 1939, pages 475–482.

Gross et al., Journal of the American Pharmaceutical Association, Scientific ed., vol. XLII, No. 2, pages 90–95, February 1953.

Hassler et al., J.A.P.A., Prac. Pharm. ed., vol. XIV, No. 1, January 1953, pages 26, 27 and 54.

Hartman et al., J.A.P.A., vol. XLV, No. 2, February 1956, pages 86–89.

McClelland et al., J.A.P.A., Pract. Pharm. ed., January 1949, pages 30–33.

Tice et al., J.A.P.A., Prac. Pharm. ed., vol. XIV, No. 1, January 1953, pages 24 and 25.

LEWIS GOTTS, *Primary Examiner.*

FRANK CACCIAPAGLIA, JR., *Examiner.*